United States Patent [19]

Fink et al.

[11] Patent Number: 4,671,364
[45] Date of Patent: Jun. 9, 1987

[54] POWER-SCREWDRIVER DEVICE WITH VARIABLE TORQUE ADJUSTMENT

[75] Inventors: Manfred Fink, Eberstadt; Klaus M. Junginger, Heilbronn, both of Fed. Rep. of Germany

[73] Assignee: C. & E. Fein GmbH & Co., Stuttgart, Fed. Rep. of Germany

[21] Appl. No.: 773,809

[22] Filed: Sep. 9, 1985

[30] Foreign Application Priority Data

Nov. 30, 1984 [DE] Fed. Rep. of Germany ....... 3443670

[51] Int. Cl.[4] .............................................. B23Q 5/00
[52] U.S. Cl. ...................................... 173/12; 81/479; 73/862.32
[58] Field of Search ...................... 173/12, 20; 73/462, 73/862.32, 862.33, 862.34; 81/470, 467, 479, 469

[56] References Cited

U.S. PATENT DOCUMENTS

| | | | |
|---|---|---|---|
| 2,663,209 | 12/1953 | Gummere et al. | 81/479 X |
| 3,448,610 | 6/1969 | Westbrook | 73/862.32 |
| 3,832,897 | 9/1974 | Schenck | 73/862.31 |
| 4,185,701 | 1/1980 | Boys | 173/12 |
| 4,485,682 | 12/1984 | Stroczel et al. | 81/467 X |
| 4,509,375 | 4/1985 | Davis | 73/862.32 |

Primary Examiner—E. R. Kazenske
Assistant Examiner—William Fridie, Jr.
Attorney, Agent, or Firm—Max Fogiel

[57] ABSTRACT

A power-screwdriver device with variable torque adjustment consists essentially of a drive mechanism, transmission, and cutoff mechanism. In order to provide a power screwdriver that is strong and inexpensive and in which the torque can be controlled with no need for a torque clutch, there is a bearing site on a transmission shaft. The bearing allows the shaft to move radially. There is a sensor that emits a motor-cutoff signal when the shaft does move radially. The radial deviation is employed as a measure of torque. The measure is adjusted with an adjusting device.

9 Claims, 3 Drawing Figures

POWER-SCREWDRIVER DEVICE WITH VARIABLE TORQUE ADJUSTMENT

BACKGROUND OF THE INVENTION

The present invention relates to a power-screwdriver device, especially an electrically powered screwdriver, with variable torque adjustment and consisting essentially of a drive mechanism, transmission, and cutoff mechanism.

A screwdriver device of this type is known from German OS No. 2 726 818 for example. The torque is adjusted in the torque-governing mechanism described therein by means of the elasticity of a helical spring, the motor is turned off when the load on a tool exceeds a prescribed torque, and a clutch that transmits the rotational force is disengaged to prevent continued rotation due to mass inertia and in order to decrease any impact or counterforce that might occur upon termination of screwdriving, ensuring reliable operation.

The drawback of the known torque-governing mechanism is that it requires a torque clutch between the transmission and the main shaft, which considerably increases the overall length of the screwdriver device. Various attempts have accordingly been made to mount wire strain gauges on one of the transmission shafts to measure the rotation of the shaft provoked by torque reaction. It is, however, not very practical for known reasons to mount strain gauges on mass-produced articles.

SUMMARY OF THE INVENTION

The object of the present invention is to provide a power screwdriver that is strong and inexpensive and in which the torque can be controlled with no need for a torque clutch.

This object is attained in accordance with the invention in that there is a bearing site on a transmission shaft that allows the shaft to move radially and in that there is a sensor that emits a motor-cutoff signal when the shaft does move radially.

The adjustable sensor will accordingly detect any radial deviation in the shaft due to torque exerted on the shaft and will generate a signal to cut off the motor. The sensor can be a conventional switch, a piezoelectric element, a Hall-effect sensor, or a path-length sensor. When a piezoelectric element is employed, there is no need for a mechanical adjustment device and the torque can be adjusted by means of an electronic component.

The torque cutoff can be adjusted mechanically by means of a stop pin and a knurled knob. This systems facilitates adjusting the application pressure at the stop pin in that a spring can act on the stop pin. The force can be varied by screwing the knurled knob into and out of a base. The stop pin tends to maintain the bearing of a transmission shaft in its operating position. When increased torque increases the axial force in the bearing so that it overcomes the force of the stop pin, the transmission shaft will shift radially, causing the switch to emit a signal. The switch's command cuts off and simultaneously short-circuits the motor, reducing and residual inertia in effect beyond the instance of cutoff. Since the transverse axial force at a bearing site in the transmission is exploited to obtain a signal that is analogous to the torque, there is no need for a torque clutch. The screwdriver device can accordingly be more compact.

The advantage of this device in comparison with known cutoff methods, which depend on motor current, is that the moments of inertia of the components (armature and transmission shaft) that rotate at high speed and generate most of the total moment of inertia, are also involved in the cutoff process, considerably increasing cutoff precision.

A preferred embodiment of the invention will now be described with reference to the attached drawings, wherein

DETAILED DESCRIPTION OF THE PREFERRED EMBODIMENT

Figure 1:
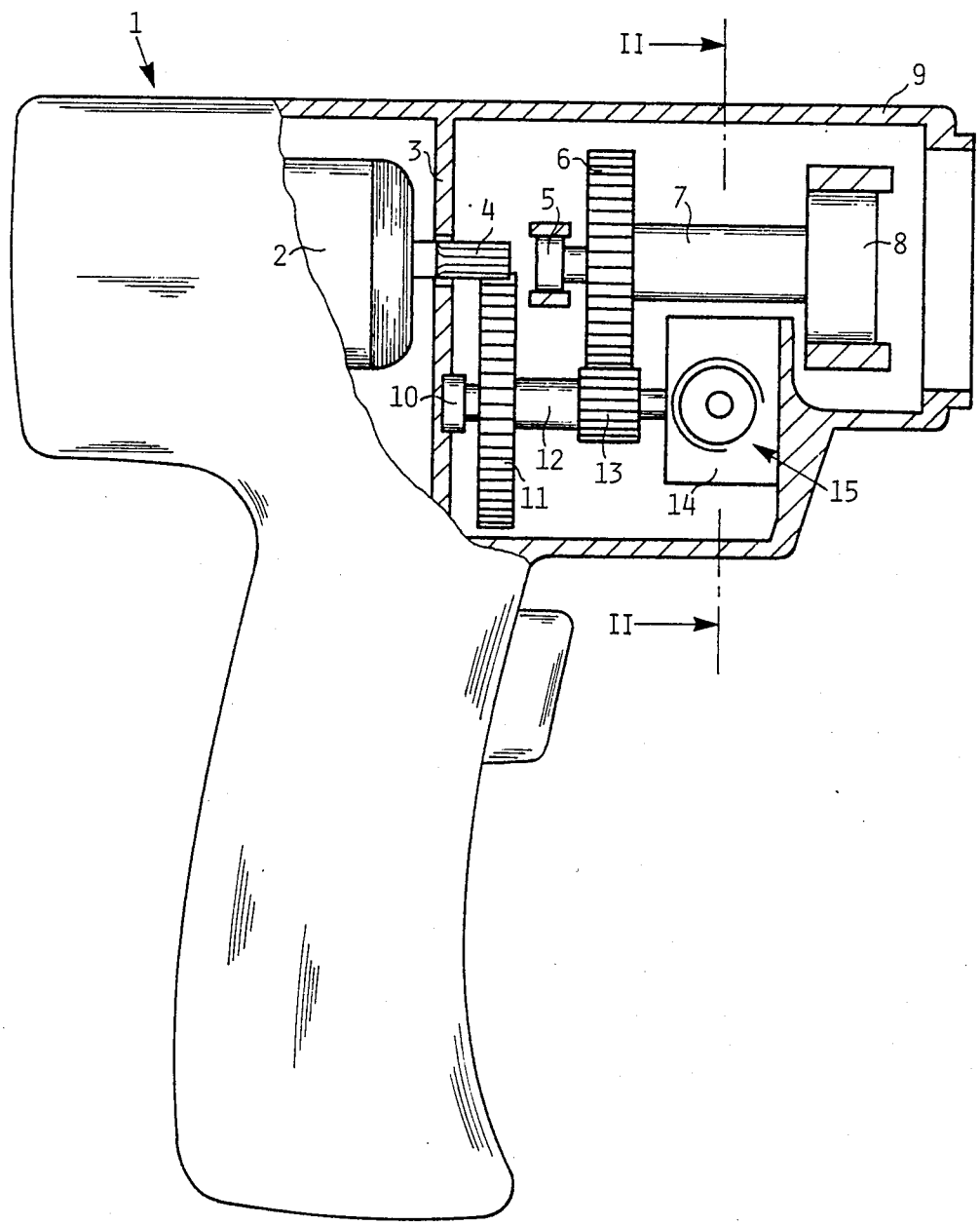
FIG. 1 is a side view of and partial section through a screwdriver device in accordance with the invention.
Figure 2:
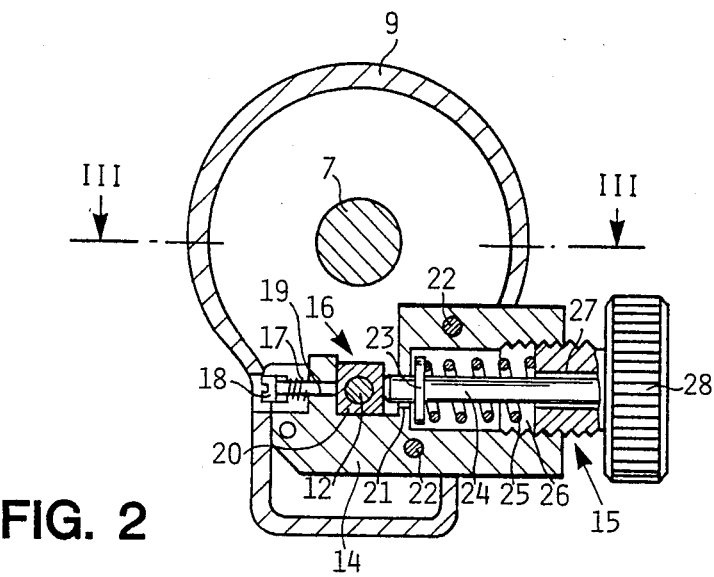
FIG. 2 is a section along line II—II in FIG. 1.
Figure 3:
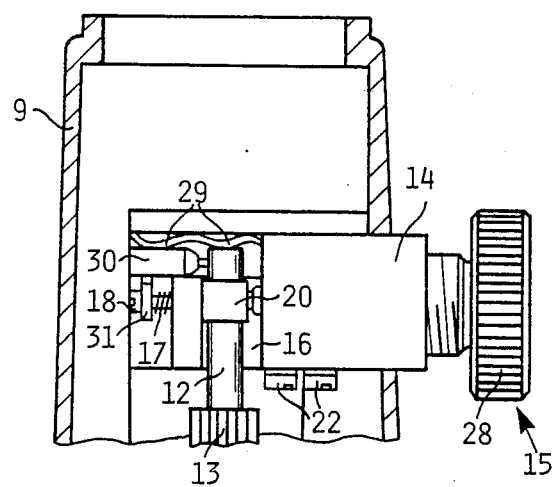
FIG. 3 is a section along line III—III in FIG. 2.

A power screwdriver 1 is powered by an electric motor 2. Between the motor space and the transmission space is a partition 3. The rotation of electric motor 2 is transferred to a transmission shaft 12 by means of a pinion 4 and of a coghweel 11. Another cogwheel 13 mounted on transmission shaft 12 forwards the rotation to still another cogwheel 6 mounted on a driveshaft 7. Driveshaft 7 is mounted in bearings 5 and 6. The end of driveshaft 7 that rests in bearing 8 is designed in a known way to accept a tool, a screwdriver blade for example. The particular structure is for simplicity's sake not illustrated.

Transmission shaft 12 is mounted at one end in a bearing 10 in partition 3 and at the other end in a friction bearing 20. Friction bearing 20 is not, like bearings 5, 8, and 10, secured in housing 9 or partition 3, but rests against the wall of a groove 16 in a adjusting device 15. Adjusting device 15 consists of a base 14 secured to housing 9 with screws 22. There are bores 19 and 21 in the walls of groove 16. A stop pin 24 with a collar 23 extends through bore 21. A spring 25 forces collar 23 against the forward wall of a hollow space 26. The other end of spring 25 rests against the face of a knurled knob 28. Knurled knob 28 is threaded into hollow space 26 and can be screwed in or out to adjust the force that spring 25 presses against collar 23 with. Stop pin 24, which is positioned on the one hand in bore 21 extends at the end on the other side of collar 23 through spring 25 and into a bore 27 in knurled knob 28.

A screw 18 screws into the flank of groove 16 that contains bore 19. Screw 18 resiliently secures a support 31 to adjusting device 15 on the side of the flank facing away from groove 16. Support 31 secures a switch 30 that has a contact resting against transmission shaft 12. A spring 17 forces support 31 against the head of knurled knob 28, making it possible to adjust switch 30 with screw 18.

A leaf spring 29 that is rigidly fastened to base 14 functions as an axial bearing for transmission shaft 12 and to secure switch 30. To create an axial mount for transmission shaft 12, leaf spring 29 engages an elevation in the hollowed-out face of transmission shaft 12.

When torque increases, the tendency of transmission shaft 12 to deviate radially also increases. The direction of deviation is dictated by groove 16. Friction, bearing 20 accordingly presses against stop pin 24. When the torque attains a high enough level to generate a radial force in friction bearing 20 that is higher than the force set for spring 25, transmission shaft 12 will deviate from its normal position. Switch 30 can then emit a signal.

The switching time of switch 30 can be finely adjusted with screw 18. Torque is adjusted with knurled knob 28. When knurled knob 28 is screwed deeper into base 14, the application force of spring 25 will increase, corresponding to a higher torque. Screwing knurled knob 28 out of base 14 results in a lower torque. It is practical to represent the situation with a scale on housing 9.

A device with notches representing predetermined torque levels can also be employed instead of the continuous adjusting device 15. Fine adjustments can then be carried out with screw 18 and switch 30. The advantage is that a torque level will not shift unintendedly once it has been set. It is, however, also possible to employ a retaining device of a known type with the illustrated continuous torque-adjustment device.

It is also possible for transmission-shaft bearing 20 to float on a torsion-rod spring positioned parallel to the driveshaft. A cam can be mounted on an extension at the rear end of the torsion rod and engaging an eccentric bore in an adjustment ring. The ring can be twisted to tension the torsion rod. This can result in a higher torque, up to a level that activates the sensor.

The invention has been described herein with reference to an exemplary embodiment. It will be understood, however, that it is receptable of various modifications, which will offer themselves to those skilled in the art and which are intended to be encompassed within the protection sought for the invention as set forth in the appended claims.

I claim:

1. Power-screwdriver device comprising: variable torque adjustment means; drive means with transmission means and cut-off means for stopping operation of said drive means; a bearing block on a transmission shaft, said bearing block allowing said shaft to move radially; and sensor means in proximity of said shaft for sensing when said shaft moves radially, said sensor means emitting a cut-off signal for stopping operation of said drive means when said shaft moves radially, said cut-off signal being applied to said drive means; motor means with a shaft and pinion thereon; partition means with an opening for passage of said motor shaft with pinion; a gear on said transmission shaft and in mesh with said pinion; a pinion on said transmission shaft and in mesh with a gear on a drive shaft mounted in bearings and having an end adapted for receiving a tool to be driven; adjustment means for limiting radial motion of said bearing block; said transmission shaft having one end mounted in a bearing held in said partition means; said adjusting means having a groove, said bearing block resting against a wall of said groove.

2. Power-screwdriver device as defined in claim 1, wherein said sensor means comprises switch means.

3. Power-screwdriver device as defined in claim 1, wherein said sensor means comprises a piezoelectric element.

4. Power-screwdriver device as defined in claim 1, wherein said sensor means comprises a Hall-effect sensor.

5. Power-screwdriver device as defined in claim 1, wherein said sensor means comprises an inductive path-length sensor.

6. Power-screwdriver device as defined in claim 1, wherein said sensor means comprises a capacitative path-length sensor.

7. Power-screwdriver device comprising: variable torque adjustment means; drive means with transmission means and cut-off means for stopping operation of said drive means; a bearing block on a transmission shaft, said bearing block allowing said shaft to move radially; and sensor means in proximity of said shaft for sensing when said shaft moves radially, said sensor means emitting a cut-off signal for stopping operation of said drive means when said shaft moves radially, said cut-off signal being applied to said drive means; motor means with a shaft and pinion thereon; partition means with an opening for passage of said motor shaft with pinion; a gear on said transmission shaft and in mesh with said pinion; a pinion on said transmission shaft and in mesh with a gear on a drive shaft mounted in bearings and having an end adapted for receiving a tool to be driven; adjustment means for limiting radial motion of said bearing block; said transmission shaft having one end mounted in a bearing held in said partition means; said adjusting means having a groove, said bearing block resting against a wall of said groove; said adjustment means comprising a base member secured to a housing, walls of said groove having bores, a stop pin with collar extending through one of said bores, spring means forcing said collar against a wall of a hollow space, a knurled knob having a face abutting against an end of said spring means, said knurled knob being threaded into said hollow space, turning of said knurled knob adjusting pressure of said spring means against said collar, said stop pin passing through said one bore and extending through said spring means and into a bore in said knurled knob.

8. A power-screwdriver device as defined in claim 7, including a support attached to said adjustment means resiliently by a screw threaded into a flank of said groove containing the other one of said bores; said support mounting a switch having a contact abutting said transmission shaft; an auxiliary spring forcing said support against said knurled knob so that said switch is adjustable by said screw.

9. A power-screwdriver device as defined in claim 8, including a leaf spring rigidly fastened to said base member and comprising an axial bearing for said transmission shaft and an abutment to said switch; said leaf spring engaging an elevation in a hollowed-out face of said transmission shaft to provide an axial mount for said transmission shaft, so that when torque on said transmission shaft increases, deviation of said transmission shaft increases radially in a direction determined by said groove and said bearing block presses against said stop pin, said bearing block having a radial force higher than the force of said spring means at a predetermined magnitude of said torque for deviating said transmission shaft from a normal position and thereby emitting a signal from said switch.

* * * * *